(12) United States Patent
Duparc et al.

(10) Patent No.: US 11,167,221 B2
(45) Date of Patent: Nov. 9, 2021

(54) LIQUID DOUBLE DISTRIBUTION DEVICE OF USE IN PARTICULAR IN AN APPARATUS IN WHICH A LIQUID PHASE FLOWS UNDER GRAVITY

(71) Applicant: SAIPEM S.P.A., San Donato Milanese (IT)

(72) Inventors: Bertrand Duparc, Voisins le Bretonneux (FR); Benjamin Rodier, Courbevoie (FR); Boris Bolosier, Montigny le Bretonneux (FR)

(73) Assignee: SAIPEM S.P.A., San Donato (IT)

( * ) Notice: Subject to any disclaimer, the term of this patent is extended or adjusted under 35 U.S.C. 154(b) by 121 days.

(21) Appl. No.: 16/604,621

(22) PCT Filed: Mar. 29, 2018

(86) PCT No.: PCT/FR2018/050773
§ 371 (c)(1),
(2) Date: Oct. 11, 2019

(87) PCT Pub. No.: WO2018/189447
PCT Pub. Date: Oct. 18, 2018

(65) Prior Publication Data
US 2020/0155960 A1 May 21, 2020

(30) Foreign Application Priority Data
Apr. 13, 2017 (FR) ...................................... 17 53236

(51) Int. Cl.
*B01D 3/00* (2006.01)
*B01D 53/18* (2006.01)
(Continued)

(52) U.S. Cl.
CPC .......... *B01D 3/008* (2013.01); *B01D 53/185* (2013.01); *B01D 3/16* (2013.01); *B01D 3/324* (2013.01);
(Continued)

(58) Field of Classification Search
CPC .......... B01D 3/008; B01D 3/16; B01D 3/324; B01D 53/185; B01J 8/0492; F25J 3/04927; F25J 2200/90
(Continued)

(56) References Cited

U.S. PATENT DOCUMENTS

| 4,569,364 A | * | 2/1986 | Keller ................... B01D 3/008 |
|   |   |   | 137/244 |
| 6,042,090 A |   | 3/2000 | Zablonier et al. |

(Continued)

FOREIGN PATENT DOCUMENTS

| CA | 2933719 A1 | 6/2015 |
| EP | 0878221 B1 | 11/2003 |

(Continued)

OTHER PUBLICATIONS

French Search Report from FR Application No. FR1753236, dated Jul. 6, 2017.
(Continued)

*Primary Examiner* — Charles S Bushey
(74) *Attorney, Agent, or Firm* — Workman Nydegger

(57) ABSTRACT

A double liquid distribution device (1) suitable for use in in a fractionating or wash column (10) including a high collector tray (2) connected to a manifold support (7) via at least two longitudinal liquid downflow ducts (5, 6), the manifold support (7) supporting at least two series of transverse tubular manifolds (8, 8a 8b) and serving to feed liquid respectively to the first series of manifolds (8a) via a first longitudinal duct (5) and to the second series of mani- (Continued)

folds (8b) via a second longitudinal duct (6), each manifold (8, 8a 8b) including distribution orifices (8c) in its under face that are suitable for distributing the liquid onto the top face of the packing bed (9). The two longitudinal liquid downflow ducts (5, 6) are connected together in a low portion (5b, 6b) by a communication device (11) fitted with a valve (12) having controlled opening that is suitable for allowing the liquid to be transferred between the two longitudinal ducts in a controlled manner.

16 Claims, 5 Drawing Sheets

(51) Int. Cl.
- *B01D 3/16* (2006.01)
- *B01D 3/32* (2006.01)
- *B01J 8/04* (2006.01)
- *F25J 3/04* (2006.01)

(52) U.S. Cl.
CPC .......... *B01J 8/0492* (2013.01); *F25J 3/04927* (2013.01); *F25J 2200/90* (2013.01)

(58) Field of Classification Search
USPC .................................. 261/97, 110, DIG. 85
See application file for complete search history.

(56) References Cited

U.S. PATENT DOCUMENTS

| | | | |
|---|---|---|---|
| 6,338,774 B1 | 1/2002 | Lehman | |
| 8,052,845 B2 | 11/2011 | Zuber et al. | |
| 8,118,284 B2* | 2/2012 | Alzner | B01D 53/185 261/97 |
| 9,630,123 B2* | 4/2017 | Sunder | B01D 3/008 |
| 10,201,766 B2 | 2/2019 | Haroun et al. | |
| 10,363,494 B2* | 7/2019 | Augier | B01D 3/009 |
| 2004/0086435 A1* | 5/2004 | Boyer | B01D 53/185 422/220 |
| 2008/0251127 A1 | 10/2008 | Zuber et al. | |
| 2016/0175733 A1 | 6/2016 | Haroun et al. | |
| 2016/0332090 A1* | 11/2016 | Johannesen | B01D 3/20 |
| 2018/0304192 A1* | 10/2018 | Perdu | B01D 53/185 |
| 2018/0318727 A1* | 11/2018 | Perdu | B01J 8/0492 |
| 2019/0321745 A1* | 10/2019 | Perdu | B01D 53/185 |
| 2020/0306720 A1* | 10/2020 | Sandford | B01D 53/78 |

FOREIGN PATENT DOCUMENTS

| | | |
|---|---|---|
| EP | 1980303 A2 | 10/2008 |
| FR | 2771017 A1 | 5/1999 |
| FR | 3030295 A1 | 6/2016 |

OTHER PUBLICATIONS

International Search Report & Written Opinion from PCT Application No. PCT/FR2018/050773, dated May 25, 2018.

* cited by examiner

LIQUID DOUBLE DISTRIBUTION DEVICE OF USE IN PARTICULAR IN AN APPARATUS IN WHICH A LIQUID PHASE FLOWS UNDER GRAVITY

BACKGROUND OF THE INVENTION

The present invention relates to the general field of liquid distributors on board a floating support and included in fractionating columns or in solvent wash columns or "scrubbers" and also in associated regeneration columns or in vertical coil heat exchangers used for liquefying natural gas, and in still more general manner in any type of vertical apparatus that is the seat of a gravity flow of a liquid phase that needs to be distributed in uniform manner in a zone arranged under the liquid distribution device and extending over a horizontal section of the gravity flow apparatus, the gravity flow apparatus being installed on board floating supports such as floating production storage and offloading units (FPSOs) or floating liquefied natural gas units (FLNGs).

The fractionating or wash columns 10 shown in FIG. 1 are the seat of transfers of material and of energy between a vapor phase moving upwards and a liquid phase moving downwards under the effect of the acceleration due to gravity. These transfers take place at the surface of the liquid phase. In order to maximize the area of the interface between the liquid phase and the vapor phase, the columns 10 are filled with "trickle beds" or packing beds 9 occupying the entire circular section of the column. These packing beds are constituted by a porous solid medium providing a large area of contact with the liquid. Under the effect of its surface tension, the liquid spreads around the solid so as wet it, thereby forming a thin film, which in turn provides a large area of contact with the vapor.

The columns 10 present a wall in the form of a cylinder having an axis that is vertical while the floating support is at rest, and that is potentially subjected to tilting movements relative to the vertical position. These columns contain a plurality of liquid distributors 1, each distributor cooperating with a packing bed 9 arranged under the distributor. Putting these two phases into contact thus requires the liquid to be sprayed by the liquid distributor, and to be spread out as uniformly as possible on the top of the packing bed, and also for the uniformity of the liquid stream to be conserved as it flows and in the event of the floating support moving, until the liquid exits from the base of the packing bed, while the vapor rises through the packing bed and through the distributor.

Coil heat exchangers provide a configuration that is almost identical to the configuration of the FIG. 1 fractionating column, it being understood that bundles of tubes wound as vertical axis coils are installed instead of, and taking the place of, packing beds.

The function of a liquid distributor of the invention is to spread out the liquid stream as uniformly as possible over a said zone, in particular over a packing bed in a column, or over a bundle of tubes wound as coils in a heat exchanger, or over any horizontal section in a vertical apparatus, in particular when the gravity flow column, heat exchanger, or vertical apparatus with its distributors are subjected to movements that disturb this spreading of liquid, giving rise to nonuniformities in the stream of liquid over the sections of the gravity flow column, heat exchanger, or vertical apparatus.

The problem specific to these gravity flow vertical apparatuses installed on FPSOs or on FLNGs that are subjected to movements is that the acceleration vector to which the stream of liquid is subjected is no longer co-linear with the axis of the column, thereby giving rise to nonuniformities in the distribution of the stream over the section of the gravity flow apparatus. It is in order to limit the amplitude of these nonuniformities, that such gravity flow apparatuses are provided with a plurality of distributors and with a plurality of said zones, in particular a plurality of packing beds in order to be able to redistribute the liquid between two said zones, thereby preventing distribution nonuniformities from propagating and amplifying by flowing over heights that are too great. When the designer desires not to increase the number of packing beds (in a column) or of bundles of coiled tubes (in a heat exchanger), the proposed liquid distribution device nevertheless enables a better distribution of liquid to be achieved than with a conventional type of gravity liquid distributor. The height of these distributors may be very significant (up to 4 meters (m)), it being understood that a single column may include up to three distributors, and a single coiled heat exchanger may include up to three bundles of tubes.

Patent EP 0 878 221 describes an example of this type of distributor for columns that are subjected to movements on board floating supports. The configuration of the distributor described in that patent is described below in the present description under the term "Mono distributor".

In its mono distributor version, a conventional distributor comprises:
in its high portion, a horizontal liquid collector tray 2 (for collecting the liquid dropping from the higher packing bed 9, or from a feeder of the column);
in its low portion, a series of straight-line tubular distribution manifolds 8 arranged horizontally and in parallel with one another, being pierced with orifices in their under faces and serving to spray and distribute the flow of liquid in uniform manner on the packing bed 9 beneath; and between the collector tray 2 and the distribution manifolds 8, a vertical central liquid downflow duct 5 feeding the distribution manifolds 8.

The flow rate of liquid through the orifices 8c in the distribution manifolds 8 is a function of the static pressure of the liquid at the inlets of the orifices, this static pressure being proportional to the height of liquid above the orifice, and thus to the height of liquid in the vertical duct 5.

The height of liquid in the central duct 5 determines the flow rates through the orifices that are situated in the manifolds 8 and that are distributed along them from the centers of the manifolds 8 of the distributor to both ends. In practice, a distributor is configured in terms of the height and the diameter of the central duct 5, and of the number and the dimensions of the manifolds 8 and of their orifices 8c, so as to obtain a range of flow rates from a minimum flow rate Qmin to a maximum flow rate Qmax for a range of heights from a minimum height Hmin to a maximum height Hmax guaranteeing a distribution of liquid that is that is satisfactory in terms of uniformity of sharing among the various orifices. With a single duct 5, it is necessary to have ratio Hmax/Hmin that is proportional to the square of the flow rates Qmax/Qmin.

In the event of the floating support moving, there will be different liquid heights for an orifice situated at the center of the manifold and for an orifice situated at the end of a manifold of the distributor. In order to guarantee good uniformity in the distribution of liquid among the various orifices, it is necessary to configure the distributor (also referred to as "hydraulically calibrating" the distributor) so that the reference liquid level at the center of the distributor is high enough relative to the difference between the liquid heights as seen respectively by an orifice situated at the center and by an orifice situated at the end of a manifold of the distributor. This calibration needs to take account of the minimum operating flow rate of the distributor since it is at the minimum flow rate Qmin that the nonuniformity in distribution among the various orifices is at its greatest in the event of the floating support tilting.

As shown in FIGS. 2A-2C and in FIGS. 3A-3C, "double distributors with overflow" have been proposed in order to improve the quality of the distribution in a column 10 that is subjected to movements and over its entire range of operating flow rates. More precisely, these distributors 1 with double liquid distribution have two central ducts 5 and 6, each feeding a specific series of manifolds 8a, 8b, with the second duct 6a projecting above the collector tray 2 so that the second duct begins to fill with liquid only when the first duct 5 overflows and the excess flow of liquid pours into the second duct 6 via its top opening 6a. Thus, if the total flow rate of liquid shared among the orifices 8c of the first manifolds 8a exceeds the maximum value $Q_1$max for uniform flow, the liquid height $H_1$ in the first duct 5 reaches a maximum value Hmax and the excess flow overflows into the second duct 6 so that the second manifolds 8b begin to operate.

This double system, referred to herein as a distributor with "double liquid distribution" serves to increase hydraulic distribution capacity. For example, if the first distributor $Q_1$ is allowed a range of flow rates having a ratio of 1 to 5 between the minimum flow rate $Q_1$min and the maximum flow rate $Q_1$max, that means that with a distributor having only one duct, the ratio of $H_1$min to $H_1$max needs to be 1 to 25, while a double distributor makes it possible to reduce the maximum height $H_1$max required for the first duct, since the second duct increases the hydraulic distribution capacity.

Nevertheless, that known double system with overflow is not satisfactory, as explained below with reference to FIG. 5A. Specifically, the operating regime of the assembly comprising the second duct 6 and the second manifolds 8b while it is in the transition zone (i.e. on passing from a mode of operation using only the first distributor to a double mode of operation with both distributors in action) is unsatisfactory so long as the excess flow via the second duct remains below a certain minimum flow rate $Q_2$min, so that the height of liquid in the second duct 6 remains less than the height $H_2$min required for ensuring good uniformity of distribution among the orifices 8c in the second manifolds 8b. When operating at a rate that is only a little greater than the maximum uniform flow rate $Q_1$max for saturating the first distributor comprising the first duct 5 and the first manifolds 8a, the second distributor comprising the second duct 6 and the second manifolds 8b is operating under poor conditions with a flow rate that is too low, less than $Q_2$min, and thus with a liquid height that is less than that required for ensuring a uniform flow rate through the second distributor.

In-depth technical analysis carried out by the inventors has made clear this defect of the "double system with overflow". Specifically, this "double system with overflow" provides distribution of a quality that is "out-of-specification" over a segment of operating flow rates that is significant (about 10%) when the flowrate begins to exceed the flowrate for which the first distributor (first duct and first manifolds) is calibrated. For example, when the first distributor is calibrated for a maximum uniform flow rate ($Q_1$max) of 65% of the nominal maximum flow rate ($Q_1$max+$Q_2$max), and when the second distributor (second duct and second manifolds) is calibrated to take the balance of the maximum uniform flow rate ($Q_2$max) between 65% and 100%, the quality of distribution by the second distributor is "out-of-specification" while the flowrate for distributing lies substantially in the range 65% to 75% of the maximum flow rate.

OBJECT AND SUMMARY OF THE INVENTION

A main object of the present invention is thus to provide a double liquid distribution device suitable for use in a fractionating or wash column, or in a coiled heat exchanger, or in any type of vertical apparatus that is the seat of a gravity flow of a liquid phase that needs to be distributed in uniform manner over a horizontal section of the apparatus in a zone under said liquid distribution device that overcomes the drawbacks of the double liquid distribution device with overflow, and in particular that guarantees uniform distribution of liquid over the entire section of a column, even while the column is being subjected to movements, and to do so over a range of flow rates that is sufficient, with flowrate distribution presenting uniformity in compliance with the expected criterion over the entire range of operating flow rates, which does not apply to existing systems with overflow while they are in the transition zone.

In accordance with the invention, this object is achieved by providing a double liquid distribution device suitable for use in any type of vertical apparatus that is the seat of gravity flow of a liquid phase that needs to be distributed in uniform manner over at least one zone situated under said double liquid distribution device, said zone extending over at least one section orthogonal to the vertical axis of said gravity flow apparatus, the liquid distribution device comprising a high collector tray connected to a manifold support via at least two longitudinal liquid downflow ducts, said manifold support supporting at least two series of transverse tubular manifolds and serving to feed liquid respectively to the first series of manifolds via a first longitudinal duct and to the second series of manifolds via a second longitudinal duct, each manifold having distribution orifices in its under face suitable for distributing the liquid over a said zone situated under said manifolds of the double liquid distribution device, the shape of the collector tray being suitable for channeling a liquid on the collector tray towards a top opening of the first longitudinal duct, and the top opening of the second duct reaching a level that lies above said collector tray; the double liquid distribution device being characterized in that the two longitudinal liquid downflow ducts are connected together in a low portion by a communication device fitted with a valve having controlled opening that is suitable for allowing the liquid to be transferred between the two longitudinal ducts in controlled manner, the opening and the closing of said valve being triggered solely on the basis of measuring the liquid level in said first and second ducts.

In particular, said gravity flow apparatus is a fractionating or wash column containing at least one packing bed extending in a said zone over the cross section of said column perpendicularly to the axial longitudinal direction ZZ' of said column.

In known manner, a packing bed is a porous solid medium within which the solid elements making it up provide a very large area of contact with the flowing fluid, the function of a packing bed being to maximize the area of contact between a vapor phase and a liquid phase so as to come as close as possible to thermochemical equilibrium between those two phases. The structure of this solid medium may be organized (referred to as "structured packing"), typically being constituted by a modular metal structure enabling relatively large surface areas to be obtained while providing great porosity to the flows of fluids. The structure of packing may also be random (referred to as "random packing") being constituted by small solid elements of special shapes, e.g. in the range 1 centimeter (cm) to 2 cm, and used for filling the packing volume with a random configuration.

The term "transverse direction" is used herein to mean a direction perpendicular to the longitudinal axial direction ZZ' that is common to the device and to the gravity flow vertical apparatus, such as a column or a coil heat exchanger, for example.

It can be understood that:
both ducts are said to be "longitudinal" in that they extend parallel to a common longitudinal direction parallel to an axial longitudinal direction ZZ' of the device;
the high collector tray extends over the cross section of said gravity flow apparatus, in particular of a said column;
so long as the liquid level on the high collector tray remains lower than the level of the top opening of the second duct, the high collector tray serves to feed liquid only to the first duct and not to the second duct;
the layout of the distribution orifices and the arrangement of said manifolds serves to distribute the liquid in a regular and uniform manner over the entire surface of the cross section of the device in said zone, thus in particular over the top surface of the packing bed of a said column; and
the first duct and the first manifolds form a first distributor and the second duct and the second manifolds form a second distributor.

A liquid distribution device of the present invention enables the relative difference of the hydraulic loads as seen respectively by two diametrically opposite points of the distribution manifolds to be limited, with this limitation of the relative difference between the loads being obtained by ensuring that the average of the two loads is large enough compared with that difference. The uniformity of the distribution of liquid thus relies on the principle of minimizing static load differences. Furthermore, if a device has two series of manifolds, each series covers the entire cross-sectional surface of the vertical apparatus (column or heat exchanger).

More particularly, for a series of orifices in a series of manifolds of a distributor, tolerance in terms of uniformity can be quantified by the value of a uniformity factor $k=(Q'-Q'')/(Q'+Q'')$, where k is less than or equal to a given limit value $k_0$, with $k_0$ preferably lying typically in the range of 4% to 10%, the value of $k_0$ depending on the service provided by the column, where Q' is the combined flow rate through the orifices of the half of the manifolds of the distributor that deliver the most (since they are subjected to a liquid height that is greater than the liquid height of an orifice situated at the center of the distributor), and where Q'' is the combined flow rate of the orifices of the half of the manifolds of the distributor that deliver the least (since they are subjected to a liquid height that is less than the liquid height of an orifice situated at the center of the distributor).

In the present invention, and unlike a conventional "overflow" device, the liquid overflowing from the first duct when filled to the maximum and going to the top opening of the second duct is provided only as an emergency device in the event of a malfunction of the controlled opening of the valve.

More particularly, said communication device with a valve having controlled opening in the distribution device of the invention leads into the low portions of each of the first and second ducts respectively operating at a height lower than Hmin, where Hmin is the minimum height required for liquid in said first and second ducts that are in communication via said valve in order to obtain uniform distribution of liquid among the various orifices of said first and second series of manifolds, with said communication device having a valve with controlled opening preferably opening out into the bottom ends of the first and second ducts, respectively.

In an embodiment, said communication device opens out into said first and second ducts at their bottom ends.

More particularly, triggering of the opening or the closing of the valve is based solely on measuring the liquid level in said first and second ducts (and not on measuring flow rate), such that:
a) with flow rate increasing in said first duct only, said valve opens automatically when the liquid level in the first duct reaches a maximum threshold value Hmax; and
b) the valve closes automatically with flow rate decreasing in said first and second ducts when the identical liquid level in the first and second ducts that are in communication via the open valve drops down to a minimum threshold value that is greater than or equal to said minimum height Hmin as defined above.

It can be understood that Hmax is less than the height of the second duct in order to avoid any risk of liquid overflowing from the first duct to the top opening of the second duct.

These parameters Hmin and Hmax are dimensional characteristics of the distributor that are calculated by the designer as a function of specifications (in particular the required uniformity of liquid distribution or the amount of distribution variation that can be tolerated), as a function of the severity of the movements, i.e. the amplitude of possible movements, and/or the extent of the flow rate ranges that are to be covered. Thereafter, in operation, they become thresholds for triggering said valve.

Preferably, in a device of the invention, the first and second distributors are configured in such a manner that:
a) $Q_2min$ is less than or equal to $Q_1max-Q_1min$;
the first and second distributors being defined as consisting in:
the first duct and the orifices of the first series of manifolds, for the first distributor; and
the second duct and the orifices (8c) of the second series of ducts, for the second distributor; and
$Q_1min$ and $Q_2min$ being defined respectively as the combined minimum flow rates through the orifices of the first and second series of manifolds respectively, that enable liquid to be distributed uniformly by said first and second series of manifolds; and
$Q_1max$ being defined as the maximum flow rate of the first distributor when the liquid height in the first duct is of maximum value Hmax; and
b) when said valve is opened and the two longitudinal ducts are put into communication with each other, the level of the liquid in the first duct that was of maximum value Hmax moves down to a liquid level $H_0$ in the second duct that is identical to the level of the first duct, $H_0$ being greater than or equal to Hmin, Hmin being the common minimum height required for liquid in said first and second ducts in communication via said valve for obtaining uniform distribution of liquid among the various orifices of said first and second series of manifolds.

These flow rate parameters $Q_1min$ and $Q_1max$, which are associated with corresponding liquid heights, are characteristics that lead to the numbers and sizes of orifices to be made in the liquid distribution manifolds during manufacture, specific for each application, and calculated by the designer as a function of specifications (required uniformity of liquid distribution or acceptable extent of variation in distribution, possible severity/amplitude of movements, extent of flow rate ranges to be covered, . . . ).

Also preferably, the first and second distributors are configured in such a manner that the flow rate corresponding to the threshold Hmax for triggering opening of said valve while flow rate is increasing in order to pass from the mode of operation with only the first distributor in action to the double distribution mode of operation with both the first and the second distributors in action, preferably $Q_1$max as defined above, is greater than the flow rate corresponding to the threshold Hmin for triggering closing of the valve while flow rate is decreasing in order to pass from the double distribution mode of operation with both the first and second distributors in action to the mode of operation with only the first distributor in action, preferably $Q_1$min+$Q_2$min as defined above. In this embodiment, specifically as a result of the way the flow rates of the two manifolds are calibrated, the device operates with hysteresis that is characterized by the fact that the flow rates corresponding to the two control-triggering thresholds respectively Hmax for opening and Hmin for closing the valve are different so as to avoid untimely phenomena of oscillation between the "mono-distributor" mode of operation and the "double distributor" mode of operation, as explained below.

More particularly, in order to obtain such hysteresis, the first and second distributors are configured in such a manner that:
a) $Q_2$min is less than $Q_1$max−$Q_1$min; and
b) $H_0$ is greater than Hmin but less than Hmax.

Still more particularly, the collector tray includes channels for channeling the liquid towards the top opening of the first vertical duct.

More particularly, the transverse tubular manifolds extend parallel in a transverse direction perpendicular to an axial longitudinal direction ZZ' of the double distribution device. Nevertheless, the manifolds could be arranged in some other way, e.g. with manifolds in the form of concentric rings.

More particularly, both series manifolds are arranged at the same level in the longitudinal direction (ZZ') of the double distribution device, the manifolds of the first series being interleaved in parallel between the manifolds of the second series.

The present invention is applicable to a fractionating column, to a washing column, to a coiled type vertical heat exchanger, or to any type of vertical apparatus on board a vessel or a floating support and including at least one double liquid distribution device of the invention arranged coaxially inside the cylindrical wall of the apparatus above a cross-section of said apparatus and perpendicularly relative to the axial longitudinal direction (ZZ') of said cylindrical wall.

More particularly, said collector tray is arranged transversely and coaxially relative to said cylindrical wall of the apparatus. It can be understood that the outline of the collector tray follows the outline of the cross section of said cylindrical wall.

Still more particularly, the apparatus may include the need to perform distributions of the liquid phase several times over (at a plurality of levels) as applies in particular to a column having a plurality of packing beds extending across the cross section of said column and spaced apart from one another in the axial longitudinal direction (ZZ') of said column, with a plurality of said double liquid distribution devices being interposed, each between two packing beds; in the same manner, for a coiled heat exchanger having a plurality of bundles, there may be a plurality of double distribution devices above each bundle.

The present invention also provides a method of distributing liquid using a double liquid distribution device of the invention receiving a liquid on said high collector tray, the method being characterized in that the following steps are performed:
e.1) filling the first longitudinal duct with liquid; and
e.2) when the liquid level in the first duct reaches a maximum threshold value, opening said valve and putting the two longitudinal ducts into communication with each other, thereby filling the second duct to the same liquid level as the first duct; and
e.3) re-closing said valve if said identical liquid level of said first and second ducts decreases below a minimum threshold value.

These level thresholds are dimensional characteristics of the distributor that are calculated by the designer as a function of specifications (uniformity and/or extent of variations in liquid distribution that are required and/or tolerated, severity and/or amplitude of movements, extent of flow rate ranges to be covered).

More particularly, the opening or the closing of the valve is triggered automatically as a function of measuring the liquid level in said first and second ducts, in such a manner that:
a) in step e.2), with flow rate increasing in said first duct only, said valve opens automatically when the liquid level in the first duct reaches a maximum threshold value Hmax; and
b) in step e.3), with flow rate decreasing in both of said first and second ducts, the valve closes automatically when the identical liquid level in the first and second ducts that are in communication via the open valve drops down to a minimum threshold value greater than or equal to Hmin, Hmin being the minimum common height required for liquid in said first and second ducts while they are in communication with each other via said valve in order to obtain uniform distribution of liquid among the various orifices of said first and second series of manifolds.

This height Hmin is determined by the combined maximum uniform flow rates $Q_1$min and $Q_2$min respectively through the orifices of the first series of manifolds and through the orifices of the second series of manifolds.

Preferably, in step e.2), said valve is opened and the two longitudinal ducts are put into communication with each other such that the level of the liquid in the first duct, which was of maximum value Hmax, drops down to a liquid level $H_0$ in the second duct that is identical to the level of the first duct, $H_0$ being greater than or equal to Hmin and corresponding to a flow rate of the second distributor that is greater than or equal to $Q_2$min; the first and second distributors being configured in such a manner that:
a) $Q_2$min is less than or equal to $Q_1$max−$Q_1$min;
the first and second distributors being defined as consisting in:
the first duct (5) and the orifices (8*c*) of the first series of manifolds, for the first distributor; and
the second duct (6) and the orifices (8*c*) of the second series of ducts, for the second distributor; and
$Q_1$min and $Q_2$min being defined respectively as the combined minimum flow rates through the orifices of the first and second series of manifolds respectively, that enable liquid to be distributed uniformly by said first and second series of manifolds; and $Q_1$max being defined as the maximum flow rate of the first distributor when the liquid height in the first duct is of maximum value Hmax; and b) on opening said valve and putting the two longitudinal ducts into communication with each other, the level of the liquid in the first duct, which is of maximum value Hmax, drops down to a liquid level $H_0$ in the second duct that is identical to the level of the first duct, $H_0$ being greater than or equal to Hmin as defined above.

Also preferably, in step e.2), said valve is opened and the two longitudinal ducts (5, 6) are put into communication with each other such that the level $H_1$ of the liquid in the first duct, which was of maximum value Hmax, drops down to a liquid level $H_0$ in the second duct that is identical to the level of the first duct, $H_0$ being greater than Hmin and corresponding to a flow rate of the second distributor that is greater than $Q_2$min; the first and second distributors being configured in such a manner that:

a) $Q_2$min is less than $Q_1$max−$Q_1$min; and b) on opening said valve and putting the two longitudinal ducts into communication with each other, the level of the liquid in the first duct, which was of maximum value Hmax, drops down to a liquid level $H_0$ in the second duct that is identical to the level of the first duct, $H_0$ being greater than or equal to Hmin.

If $H_0$ is greater than Hmin, it is then advantageously possible to cause the device to operate with hysteresis that is characterized by two different liquid level thresholds for triggering the communication valve in opening and in closing, so as to avoid phenomena of untimely oscillation between the "mono-distributor" mode of operation and the "double distributor" mode of operation, as explained below.

Preferably, the flow rate at the threshold for triggering opening of said valve, while flow rate is increasing, in order to pass from the mode of operation with only the first distributor in action to the double distribution mode of operation with both the first and the second distributors in action is greater than the flow rate at the threshold for triggering closing of the valve, while flow rate is decreasing, in order to pass from the double distribution mode of operation with both the first and second distributors in action to the mode of operation with only the first distributor in action.

Under such circumstances, a method of the invention may comprise the following steps:

1) increasing the liquid level in the first duct only; and
2) opening said valve when the liquid level reaches the maximum height threshold Hmax in the first duct corresponding to a maximum uniform flow rate $Q_1$max of the first distributor and putting the two longitudinal ducts into communication so that the level of the liquid in the first duct, which was of maximum value Hmax, drops down to a liquid level $H_0$ in the second duct that is identical to the level of the first duct, $H_0$ being greater than said value Hmin; and
3) the liquid level increases from $H_0$ in both the first and the second ducts, the device now being in the double distribution mode of operation with both the first and second distributors in action, the combined flow rate of both distributors increasing from $Q_1$max to $Q_1$max+$Q_2$max, $Q_2$max being defined as the maximum flow rate of the second distributor when the identical liquid height in the first and second ducts is at a maximum Hmax; and
4) when the device is in the double distribution mode of operation with both the first and second distributors in action, the flow rate lying in the range $Q_1$max to $Q_1$max+$Q_2$max, if the flow rate decreases, said valve is closed only when the flow rate reaches a minimum threshold value $Q_0$ in the range $Q_1$min to $Q_1$max with a level Hmin of the liquid in both ducts, $Q_0$ being greater than or equal to $Q_1$min+$Q_2$min and preferably equal to $Q_1$min+$Q_2$min; and
5) after closing said valve, the liquid level in the first duct rises to a value $H_1$ greater than Hmin but less than Hmax with a flow rate in the range $Q_1$min and $Q_1$max, the device remains in the single distribution mode of operation with only the first distributor in action so long as the liquid level does not exceed Hmax in the first duct.

In the present description, and as shown in the figures, the liquid heights in the first and second ducts, $H_1$, $H_2$, Hmin, and Hmax should be understood as heights relative to the base of the distributor defined by the horizontal plane passing through the bottoms of the ducts and of the manifolds.

Hmax and Hmin are dimensional characteristics of the distributor that are calculated in order to achieve a certain degree of performance in terms of uniformity of liquid distribution, for given conditions of movement severity and for flow rate ranges that are defined by specifications.

In operation, the levels in the vertical ducts of the distributor are measured in order to control the valve; however the trigger thresholds Hmin and Hmax for the valve are thus characteristics intrinsic to the equipment.

The flow rate and liquid height parameters of the invention are thus calibration characteristics for the equipment. Specifically, the person skilled in the art knows that a device of this type is necessarily of a structure that is characterized so as to satisfy properties associated with the definition of the flow rate ranges Qmin and Qmax that guarantee uniform liquid distribution, with this being done, in particular, as a function of the number and the size of the holes to be made in the distribution manifolds or the diameter of the distribution manifolds. Techniques for determining these characteristics are known to the person skilled in the art and they are not the subject matter of the innovation.

BRIEF DESCRIPTION OF THE DRAWINGS

Other characteristics and advantages of the present invention appear from the following description made with reference to the accompanying drawings, which show an embodiment having no limiting character. In the figures:

in FIG. 1, the packing bed 9 extends from the top dashed line under a top distributor to the pair of dashed lines situated lower down (above the chimney tray of the lower distributor);

DETAILED DESCRIPTION OF THE INVENTION

Figure 1:
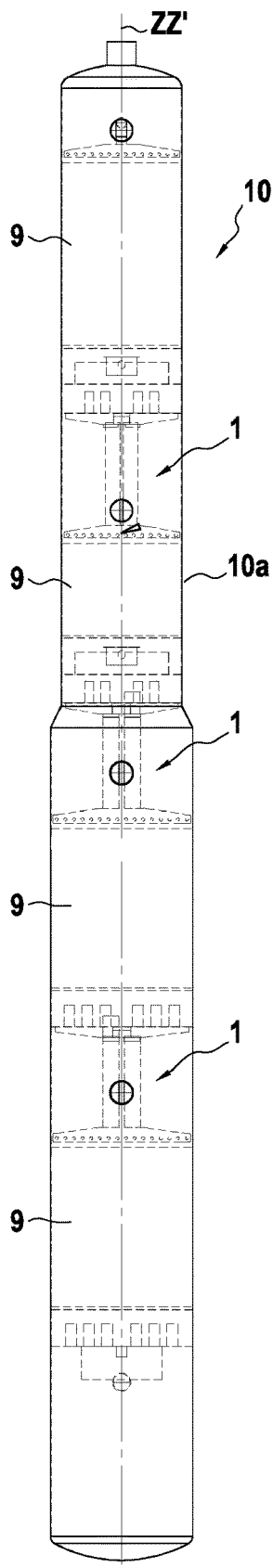
FIG. 1 is a view of a fractionating column 10 having a plurality of liquid distributors 1 cooperating with a plurality of packing beds 9.

FIG. 1 shows a fractionating or phase separating column 10 having a cylindrical wall 10a and containing three liquid distribution devices 1 arranged axially above three respective packing beds 9, each occupying the entire circular section of the column. The packing of these beds may be of the "structured" type such as "Mellapak™" structured packing from the supplier SULZER (CH) or "FLEXIPAC®" packing from the supplier KOCH GLITSCH (USA) or "INTALOX®" or "IMTP®" random packing from the supplier KOCH GLITSCH (USA).

Figure 2A:
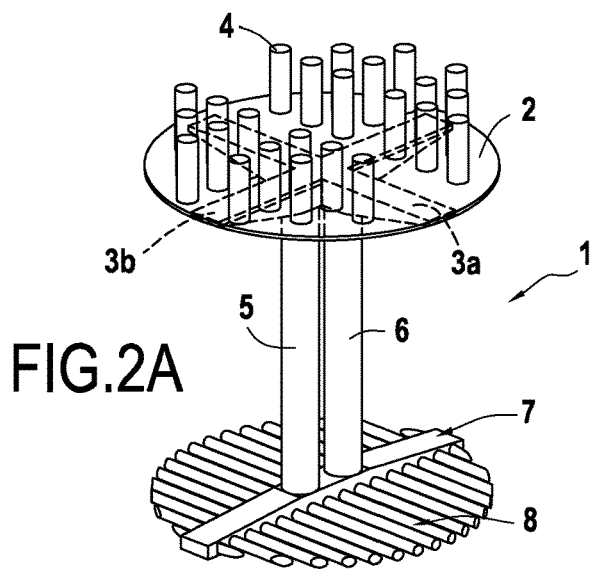
FIGS. 2A, 2B, and 2C are views of a prior art double liquid distributor device with overflow having two vertical ducts 5 and 6 arranged side-by-side in the proximity of the central axis ZZ' and symmetrically relative thereto, shown in a perspective view (FIG. 2A), in a side view (FIG. 2B), and in a plan view (FIG. 2C)
Figure 2B:
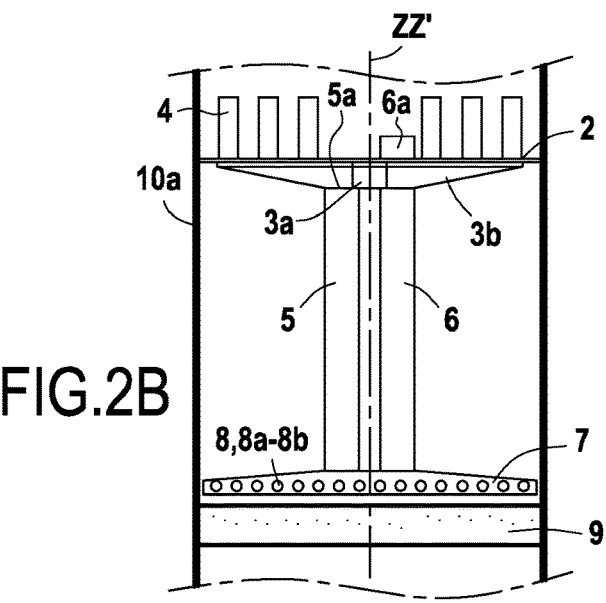
Figure 2C:
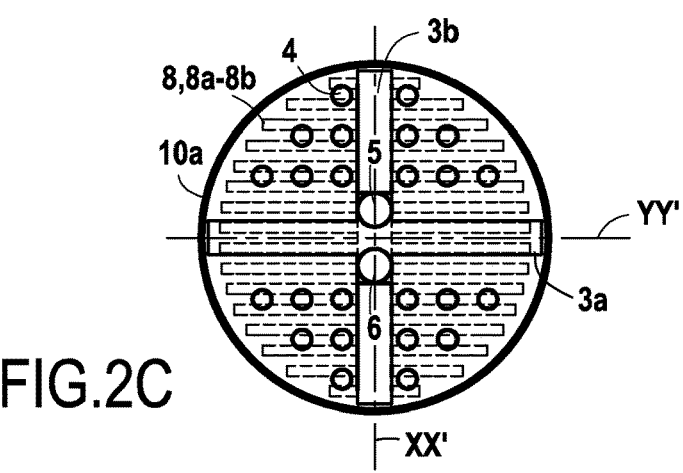

FIGS. 2A-2C, and also FIGS. 3A-3C and 4A-4B, show a double liquid distribution device 1 suitable for use in a fractionating or wash column 10 containing at least one packing bed 9 extending over the cross section of said column perpendicularly to the axial longitudinal direction ZZ' of said column. From bottom to top, the liquid distribution device 1 comprises:

a high collector tray 2 of circular outline and of diameter equal to the diameter of the cylindrical wall 10a, the tray 2 having a horizontal plane surface (perpendicular to ZZ') including two channels 3a and 3b with sloping bottoms that are arranged diametrically in a cross configuration to trap the liquid and direct it down towards a first liquid downflow duct 5, the tray also supporting chimneys 4 allowing the vapor phase to rise (which chimneys have hats that are not shown in the figures);

two parallel longitudinal liquid downflow ducts 5 and 6 arranged symmetrically in the proximity of the axis ZZ' of the tray 2 and of the column 10, connecting said tray 2 to a manifold support 7, the top opening 5a of the first longitudinal duct 5 being level with the bottom of the channels 3a-3b, while the top opening 6a of the second duct reaches a level that is at a height h0 above said collector tray 2;

said manifold support 7 being arranged diametrically and supporting two series of transverse tubular manifolds 8, 8a-8b arranged perpendicularly to the axis ZZ' (horizontally) and parallel to one another; and a first series of manifolds 8a is fed solely by the first longitudinal duct 5 and a second series of manifolds 8b is fed exclusively respectively by the second longitudinal duct 6, each manifold 8, 8a-8b having distribution orifices 8c arranged in its under face and suitable for spraying the liquid 8d onto the top face of the packing bed 9 under the double liquid distribution device.

Figure 3A:
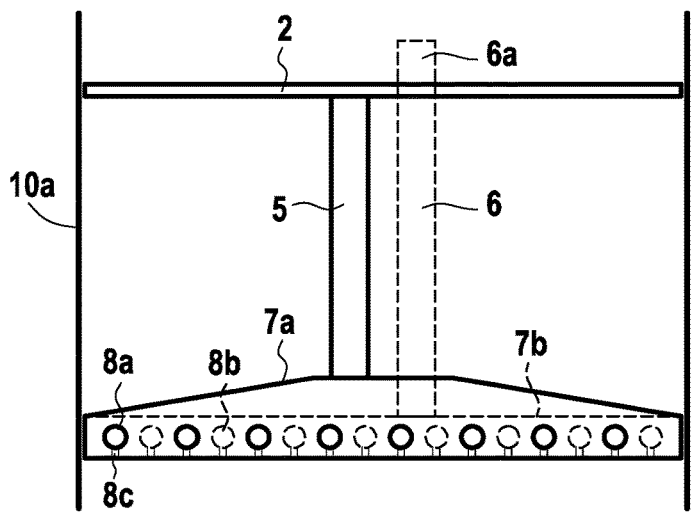
FIGS. 3A and 3B-3C are diagrammatic views of a double liquid distributor showing the cooperation between the two distribution systems having two different arrangements for the two series of manifolds 8a and 8b relative to one another.

In FIG. 3A, in a preferred embodiment, the manifolds 8a of the first duct 5 are interposed on a common level between the empty manifolds 8b of the second duct 6 that extends to a greater height than the first duct.

Figure 3B:
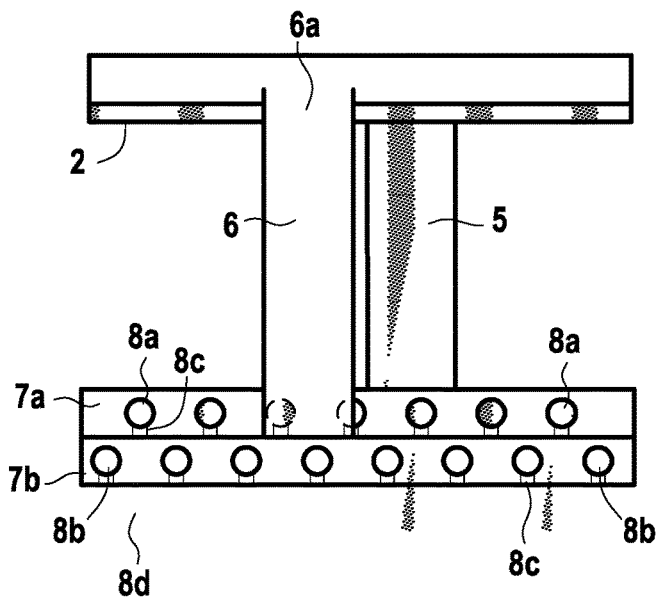
Figure 3C:
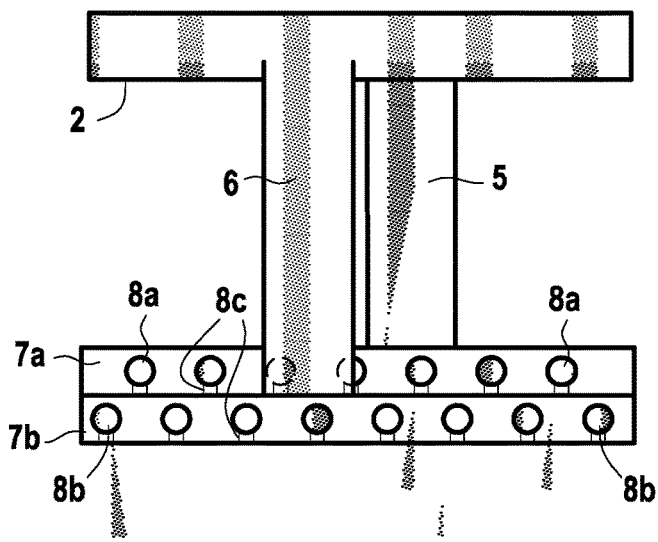

FIGS. 3B and 3C show the manifolds 8a of the first duct 5 interposed in staggered manner between the manifolds 8b of the second duct 6 and arranged at a level that is just a little higher than the manifolds 8b so as to show more clearly the principle of operating two series of manifolds and so as to identify better which manifolds correspond with which ducts, each manifold being fed exclusively via only one of the vertical ducts. However, in practice, the manifolds of a double distributor are all at the same height.

In FIG. 3B, the device is operating in single or "mono-distributor" mode, with only the first duct 5 and the first manifolds 8a being full of liquid 8d for spraying through the orifices 8c. In FIG. 3C, the device is operating in double mode, with both of the ducts 5 and 6 and both series of manifolds 8a and 8b being shown completely full of liquid and with maximum flow rates.

Figure 4A:
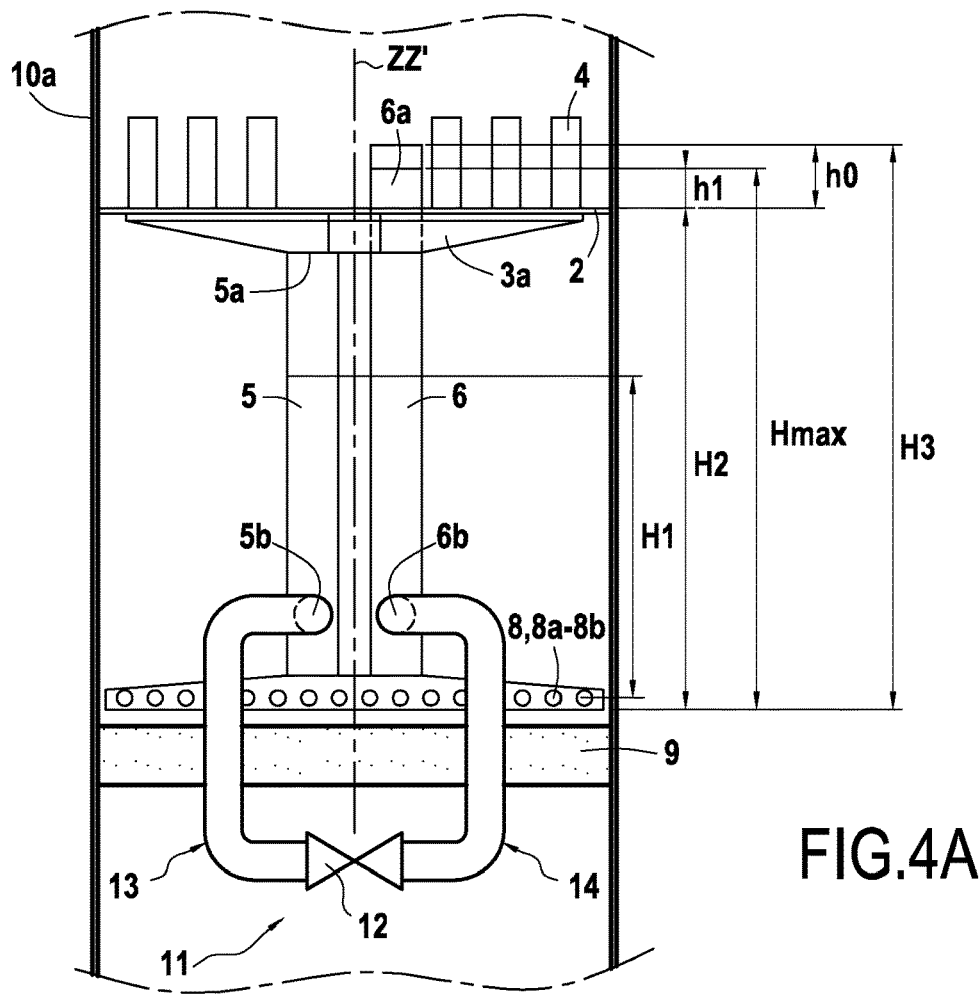
FIGS. 4A and 4B are views of a double liquid distributor of the invention with a device 11 for controlled communication between the two ducts 5 and 6, shown in side view (FIG. 4A) and in plan view (FIG. 4B)
Figure 4B:
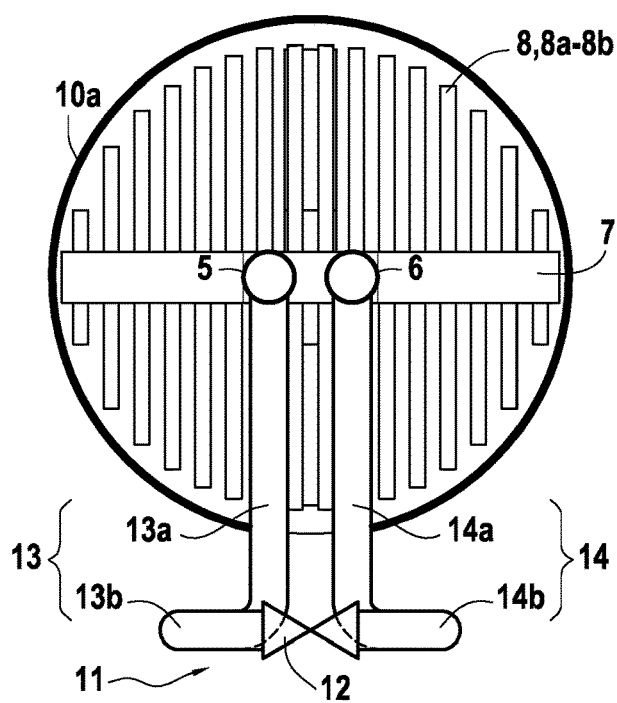

FIGS. 4A and 4B show a double liquid distributor of the invention identical to that shown in FIGS. 2 and 3, but also fitted with a communication device 11 providing communication between the two ducts 5 and 6 and including a valve 12 with controlled opening and closing. The communication device 11 comprises two angled ducts with multiple bends 13 and 14, together with a valve 12. The two angled ducts 13 and 14 provide connections between the valve 12, which is located outside the wall 10a, and the bottom portions respectively of the first duct 5 and of the second duct 6. The two angled ducts 13 and 14 are arranged symmetrically relative to the valve 12, with portions 13a and 14a that are connected to the ducts 5 and 6 being arranged inside the wall 10a, and with portions 13b and 14b that are connected to the valve 12 being arranged outside of the wall 10a.

The valve 12 is positioned outside the wall 10a for practical maintenance reasons. However, it is entirely possible to envisage said valve remaining inside the wall 10a. Furthermore, the ducts 13 and 14 could be of some other shape without changing the principle of the invention. In contrast, the valve 12 must be positioned at the low point, without any "pockets" along the paths followed by the elements of the ducts 13 and 14 to ensure that, in the event of the distributor being used with cryogenic liquids, the vapor bubbles produced by the liquid evaporating in the dead arms can be discharged naturally towards the inside of the column. Furthermore, in order to avoid risking unpriming the flow, given that the liquid is at its bubble point, the elements of the ducts 13 and 14 must remain at heights that are lower than Hmin, i.e. in this example that the portions 13a and 14a must follow paths that remain at a height that is lower than the height corresponding to the liquid level Hmin.

The height H3 of the second duct is equal to the height H2 of the first duct+h0, where h0 is the extra height of the second duct and is equal in practice to about 10% of H2.

The minimum liquid height Hmin required in both ducts 5 et 6 for feeding all of the orifices in the two series of manifolds 8a and 8b depends on the amplitude of the tilting, in practice about 5° to 20°, on the dimensions (length and diameter) of the manifolds, and on the range or ratio that is required between the minimum flow rate Qmin and the maximum flow rate Qmax. Thus, the number and the size of the holes 8c and the heights of the first and second ducts 5 and 6 are determined so as to deliver the desired minimum uniform flow rates $Q_1min$, $Q_1min$ at said minimum liquid height Hmin and the desired maximum uniform flow rates $Q_1max$, $Q_2max$ at a maximum liquid height Hmax.

The minimum height Hmin can be calculated from the diameter D of the column, which determines the lengths of the manifolds, from a criterion E for the relative difference in the flow rates due to the movement of the float, this flow rate difference being the difference between a central orifice and an "extreme" orifice of a manifold, and from an angle "dynamic alpha" defined by the angular sector formed between the acceleration vector and the axis ZZ' in the reference frame of the vessel. Thus, $Hmin=D\times0.5\times\tan(alpha)\times(1/((1+E)^2-1))$. The number and the size of the orifices are calculated so that the distributor can pass the flow rate Qmin at a height Hmin while guaranteeing sufficient uniformity. The intended uniformity (factor $k_0$) thus determines the required ratio Hmin/D.

The maximum liquid height Hmax in the distributor results from the minimum flow rate Qmin and from the ratio Qmax/Qmin, i.e. $Hmax/D=(Qmax/Qmin)^2\times Hmin/D$. Typically, the ratio Qmax/Qmin is 100/40. By way of illustration, for a maximum difference E of 8.5% and for an angle alpha of 10°, Hmin is 0.5×D. Typically Hmax/D is in the range 0.5 to 1.5. Typically D is 4 m to 5 m and E=5% to 15%.

The intended uniformity (factor $k_0$) determines the required ratio Hmin/D. However, the effective ratio Hmin/D depends subsequently on the effective flow rate at which the column is to be operated, it being possible for the uniformity criterion to be in compliance for the tilt angle taken into consideration during design only for a flow rate that is greater than or equal to the minimum flow rate Qmin that was taken into account during said design.

Figure 5A:
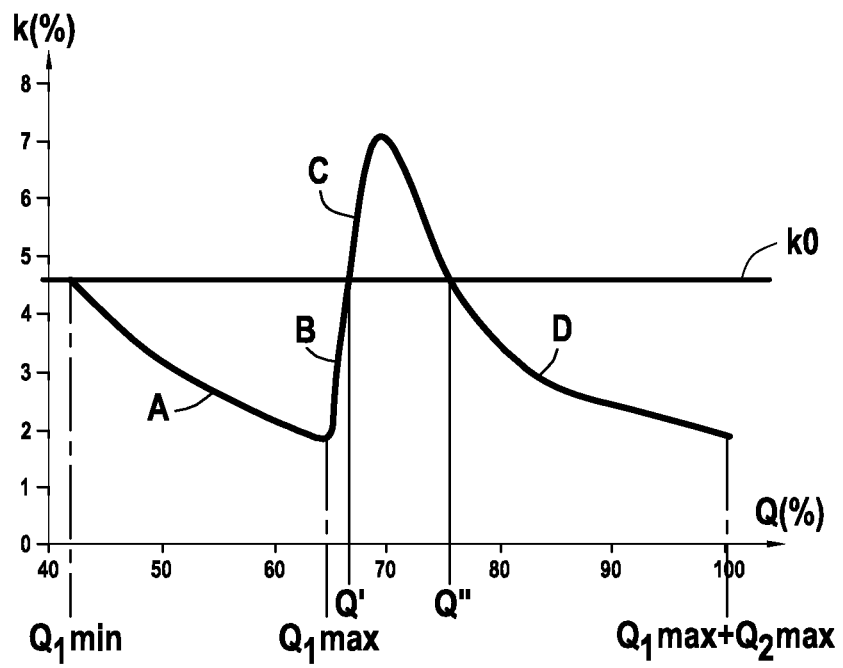
FIGS. 5A and 5B are graphs showing how the uniformity parameter k varies as a function of flow rate in the first duct in a double distributor of the prior art (FIG. 5A) and of the invention (FIG. 5B)
Figure 5B:
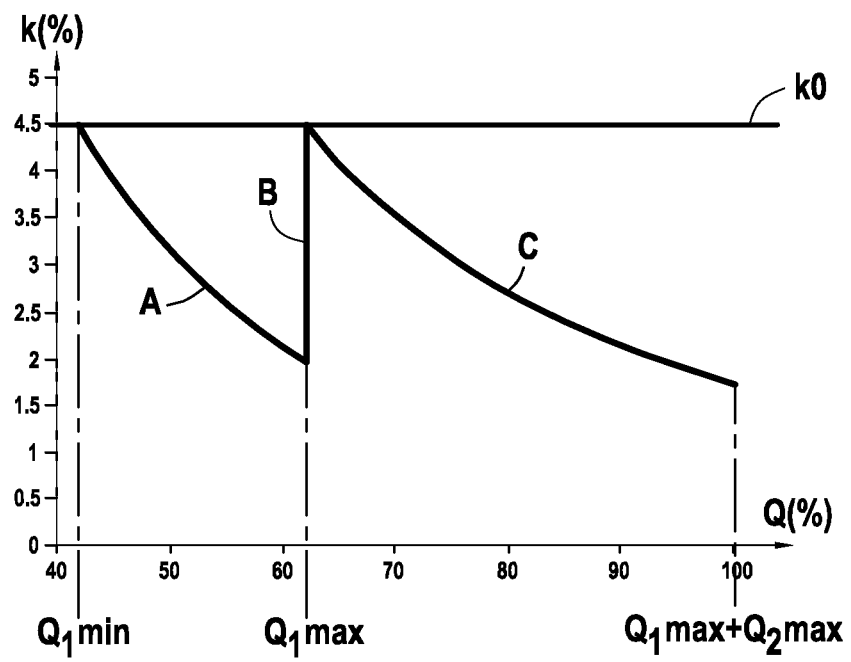

In FIGS. 5A and 5B, the distributors are calibrated for the manifolds having a maximum length of 4.15 m and $Q_1min/(Q_1max+Q_2max)=40\%$ so that $k_0$ is 4.5%.

In FIG. 5A, it can be seen that in a prior art double distributor with overflow, when in a maximum tilt situation, and when the liquid height in the first duct is increased, the following various successive stages take place:

curve A: the flow rate of the first distributor goes from $Q_1min$ at 42% to $Q_1max$ at 65% when the liquid level in the first duct goes from Hmin to Hmax, with the uniformity of distribution among the various orifices of the distributor increasing since k decreases to less than $k_0$; then curves B and C: the liquid overflows from the first duct and pours into the second duct, with the combined flow rate through both the distributors increasing up to a range (curve C) from Q'=66.58% to Q"=75.7%, in which range the required minimum height Hmin is not reached in the second duct, and as a result the distribution is not sufficiently uniform, with nonuniformity increasing, and k exceeding $k_0$=4.5% up to 7%; then curve D: the liquid height in the second duct exceeds Hmin and the combined flow rate increases, with k decreasing to a minimum value of 1.5% when the combined maximum flow rate reaches $(Q_1max+Q_2max)$.

In that prior art embodiment, over an operating flow rate lying in the range $Q_1min$ to $Q_1max+Q_2max$, there is thus a flow rate bandwidth between Q' and Q" of almost 10% (assuming $Q_1max+Q_2max=100\%$) right in the middle of the operating flow rate range and that lies outside the required uniformity tolerance.

Figure 6:
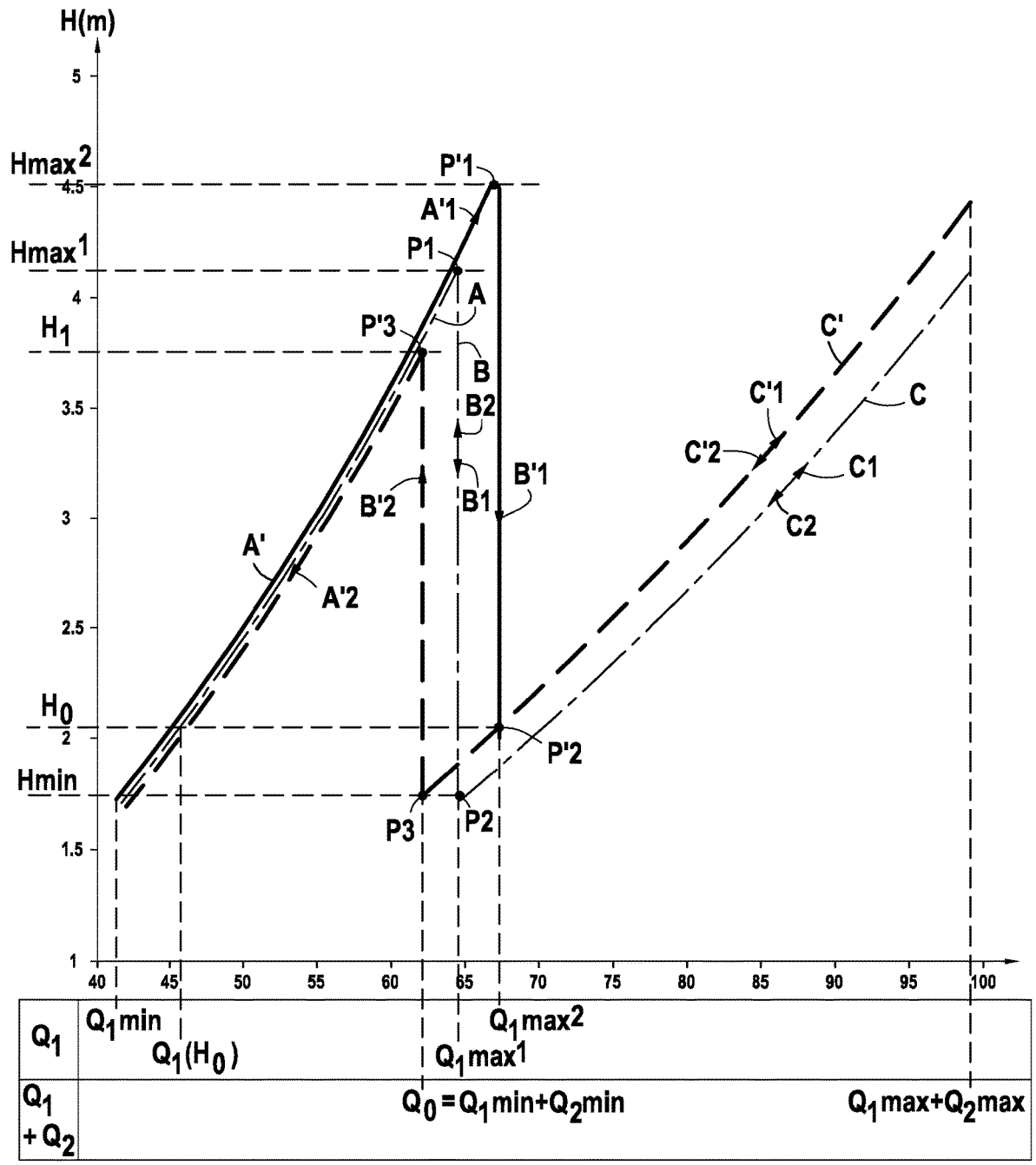
FIG. 6 shows graphs plotting the variation in the liquid height as a function of flow rate, illustrating the operation of a device of the invention, both with a single valve opening or closing threshold (without hysteresis: curves A, B, and C), and with two distinct valve thresholds respectively for opening and for closing (with hysteresis: curves A', B'1/B'2, and C').

In FIG. 5B and in FIG. 6 (curves A, B, and C without hysteresis drawn in fine lines), it is shown that in a double distributor of the invention with a communication device 11 having a valve 12 with controlled opening, and in a situation of maximum tilt, when the liquid height in the first duct is increased, with the second distributor being hydraulically calibrated to deliver the flow rate difference $Q_2min=Q_1max-Q_1min$ with a liquid height Hmin, the various following stages take place:

curve A: the flow rate goes from 0 to $Q_1max$, with the liquid level going from 0 to $Hmax^1$ (passing via Hmin for $Q_1min$) in the first distributor operating as a mono distributor, and the uniformity of distribution among the various orifices of the first distributor increases, since k decreases below $k_0$, and then at point P1;

curve B: the low communication valve 12 between the two ducts is opened, with the liquid passing through this valve from the first duct to the second duct until, at point P2, the liquid height changes almost instantaneously to be identical in both ducts at $H_0$=Hmin, with the flow rate going from $Q_1max=Q_1max^1$ to $Q_1min$ in the first distributor and from 0 to $Q_2min=Q_1max^1-Q_1min$ in the second distributor, such that the combined flow rate through both distributors remains unchanged at P2 and practically equal to $Q_1max=Q_1max^1$; and then curve C: when the combined flow rate through both distributors increases from $Q_1max^1$ to $(Q_1max+Q_2max)$, the liquid height in both ducts increases identically and simultaneously from Hmin to $Hmax^1$, with k decreasing down to a minimum value of 1.5% when the combined maximum flow rate is reached.

Hmax=H2+h1, where h1 is the maximum liquid height allowed on the collector tray 2, h1 being less than h0 to avoid untimely overflowing of liquid into the second duct before the valve 12 is opened.

In this embodiment in accordance with the invention, the cycle of opening and closing the valve respectively for increasing and decreasing flow rates is without hysteresis, the trigger threshold for the valve being identical for opening the valve at P1 while the flow rate is increasing in the direction B1 to C1, and for closing the valve at P2 while the flow rate is decreasing in the direction C2 to B2.

FIG. 6 also shows the advantageous operation of a variant calibration for a double distributor of the invention that presents hysteresis. In this advantageous variant, in order to avoid any risk of operating instability in the vicinity of the flow rate for opening/closing the valve to switch between the "mono-distributor" mode and the "double distributor" mode, the device is configured so as to be capable of performing hysteresis so that the flow rate $Q_1max=Q_1max^2$ corresponding to the trigger threshold $Hmax^2$ for opening the valve while flow rate is increasing is greater than the flow rate $(Q_1min+Q_2min)$ corresponding to the trigger threshold Hmin for closing the valve while flow rate is decreasing. The fact that these two thresholds Hmin and Hmax for controlling the communication valve correspond to two different flow rates $Q_1max$ and $(Q_1min+Q_2min)$ serves to avoid phenomena of untimely oscillation between the "mono-distributor" mode of operation and the "double distributor" mode of operation.

To do this, the second distributor is hydraulically calibrated so as to guarantee a liquid level Hmin not for a flow rate $Q_2min=Q_1max-Q_1min$ but for a fraction of $Q_1max-Q_1min$, i.e. $Q_2min=r\times(Q_1max-Q_1min)$ where r is less than 1.

In FIG. 6, the following stages take place:

curve A' in the direction A'1: the flow rate goes from 0 to $Q_1max^2$, with the liquid level going from 0 to $Hmax^2$ (passing via Hmin for $Q_1min$) in the first distributor operating as a mono distributor, and the uniformity of distribution among the various orifices of the first distributor increases, since k decreases below $k_0$, and then at point P'1;

curve B'1: the low communication valve 12 between the two ducts 5 and 6 is opened, and the liquid flows through the valve from the first duct to the second duct, until the liquid height becomes identical almost instantaneously in both ducts at $H_0$ greater than Hmin, the flow rate passing from $Q_1max^2$ to $Q_1(H_0)$ with $Q_1(H_0)>Q_1min$ in the first distributor and passing from 0 to $Q_2(H_0)=(Q_1max^2-Q_1(H_0))$ with $(Q_1max^2-Q_1(H_0))<(Q_1max^2-Q_1min)$ in the second distributor, such that the combined flow rate through both distributors is initially unchanged and substantially equal to $Q_1max=Q_1max^2$, and then at point P'2;

curve C' in the direction C'1: the device operates in double distribution mode with both distributors. When the combined flow rate through both distributors increases from $Q_1max^2$ to $(Q_1max+Q_2max)$, the liquid height in both ducts increases identically and simultaneously from $H_0$ to $Hmax^2$, with k decreasing down to a minimum value of 1.5% when the combined maximum flow rate is reached.

curve C' in the direction C'2 and then B'2: while the device is operating in the double distribution mode of operation with both the first and second distributors in action, with the flow rate lying in the range $Q_1max^2$ to $Q_1max+Q_2max$, if the flow rate decreases, then said valve 12 is closed at P3 only when the liquid level reaches Hmin with a flow rate $Q_0$ in both ducts 5 and 6; and curve B'2: on closure of the valve 12, the device passes at P'3 into the single distribution mode of operation with only the first distributor in action, the liquid level in the first duct rises to a value $H_1$ less than $Hmax^2$ with a flow rate $Q_0=(Q_1min+Q_2min)$ lying in the range $Q_1min$ to $Q_1max^2$; and curve A' and direction A'2: the first distributor remains in operation in mono-distributor mode if the flow rate decreases further from $Q_0$ to 0, or so long as the flow rate remains less than $Q_1max^2$.

In both embodiments shown in FIG. 6 (with and without hysteresis), the device is calibrated for the same maximum saturation flow rate $Q_1max^1+Q_2max^1$ (without hysteresis) $=Q_1max^2+Q_2max^2$ (with hysteresis). Furthermore $Q_1max^2>Q_1max^1$ and $Q_2max^2<Q_2max^1$.

Nevertheless, when there is hysteresis, the first distributor must be made to operate with a greater liquid load prior to opening the valve ($Hmax^2$ is greater than $Hmax^1$). Also, the second distributor is calibrated for a flow rate that is lower in the "without hysteresis" situation: given that r is selected so that $0<r<1$, then $Q_2min=r\times(Q_1max-Q_1min)$ with hysteresis$<Q_2min=Q_1max-Q_1min$ without hysteresis. Specifically, when the total flow rate decreases starting from 100%, i.e. $(Q_1max+Q_2max)$, the flow rate threshold at P3, which corresponds to closing the valve (for a height Hmin), must be less than in the "without hysteresis" situation at P2.

In both of the embodiments of FIG. 6 (with and without hysteresis), the uniformity of the distribution remains in compliance with the required uniformity tolerance, with k being less than $k_0$ over the entire operating flow rate range from $Q_1min$ to $(Q_1max+Q_2max)$. For the same saturation flow rate $(Q_1max+Q_2max)$, the height Hmax is slightly greater than the same height for a double distributor with overflow. Specifically, for a double distributor with controlled valve opening in accordance with the invention and calibrated in this way, the ratio Hmax/Hmin is equal to the flow rate ratio Qmax/Qmin, whereas for a mono distributor the same ratio Hmax/Hmin is equal to the square of the ratio of the maximum and minimum flow rates.

In FIG. 6, for the respective configurations "with" and then "without" hysteresis, it is the length of the ducts 5 and 6, and thus the height of the collector tray 2 above the manifolds 8 that changes between the two configurations; however the thickness h1 of the sheet of liquid on the tray 2 is the same in both situations, say 0.2 m. In a device with controlled opening, the sheet of liquid rises up to the top of the overflow 6a only in the event of the valve malfunctioning. In the invention, the overflow 6a is an emergency device.

Under all circumstances, opening or closing of the valve 12 is triggered solely on the basis of measuring the level of the liquid (and not on measuring flow rate). When the liquid level in the duct 5 reaches the threshold Hmax the valve 12 opens, and when the liquid level in both ducts 5 or 6 drops down to the threshold Hmin the valve 12 closes.

The specific nature of a system with hysteresis lies firstly in the ducts 5 and 6 being lengthened in order to increase the maximum liquid height of the first distributor and thus obtain a value $Q_1max^2$ greater than $Q_1max^1$, and secondly in how the series of manifolds in the second submitter is calibrated: this series is calibrated so that the flow rate $Q_1max^2$ reached in the first distributor on its own before opening the valve leads subsequently to a liquid height $H_0$ (identical in both ducts 5 and 6) that is greater than Hmin once the valve is open. In a system without hysteresis, the level $H_0$ reached immediately after opening the valve is equal to Hmin.

If H0 is greater than Hmin, the device operates de facto with hysteresis, which is characterized by the fact that the flow rate $Q_1max^2$ corresponding to the threshold $Hmax^2$ for opening the valve 12 is different and of value greater than the flow rate $Q_1min+Q_2min$ corresponding to the threshold for re-closing the same valve 12 at the level Hmin in order to avoid untimely oscillation phenomena between the "mono-distributor" mode of operation and the "double distributor" mode of operation.

The invention claimed is:

1. A double liquid distribution device suitable for use in any type of vertical apparatus that is a seat of gravity flow of a liquid phase that needs to be distributed in uniform manner over at least one zone arranged under said double liquid distribution device and extending over at least one section orthogonal to a vertical axis of said vertical apparatus, the double liquid distribution device comprising a high collector tray connected to a manifold support via at least two longitudinal liquid downflow ducts, said manifold support supporting at least two series of transverse tubular manifolds and serving to feed liquid respectively to a first series of manifolds of the at least two series of transverse tubular manifolds via a first longitudinal duct of the at least two longitudinal liquid downflow ducts and to the second series of manifolds of the at least two series of transverse tubular manifolds via a second longitudinal duct of the at least two longitudinal liquid downflow ducts, each manifold having distribution orifices in its under face suitable for distributing the liquid over said at least one zone situated under said manifolds of the double liquid distribution device, a shape of the high collector tray being suitable for channelling a liquid on the high collector tray towards a top opening of the first longitudinal duct, and a top opening of the second longitudinal duct reaching a level that lies above said high collector tray;

wherein the at least two longitudinal liquid downflow ducts are connected together in a low portion by a communication device fitted with a valve having controlled opening that is suitable for allowing the liquid to be transferred between the at least two longitudinal liquid downflow ducts in a controlled manner, opening and closing of said valve being triggered solely on a basis of measuring a liquid level in said first and said second longitudinal ducts.

2. The double liquid distribution device according to claim 1, wherein the communication device opens out into the respective low portions of each of the first and the second longitudinal ducts at their bottom ends.

3. The double liquid distribution device according to claim 1, wherein triggering of the opening or the closing of the valve is based solely on measuring the liquid level in said first and said second longitudinal ducts, such that:
- a) with flow rate increasing in said first longitudinal duct only, said valve opens automatically when the liquid level in the first longitudinal duct reaches a maximum threshold value Hmax; and
- b) with flow rate decreasing in both of said first and said second longitudinal ducts, the valve closes automatically when an identical liquid level in the first and the second longitudinal ducts that are in communication via the open valve drops down to a minimum threshold value greater than or equal to Hmin, Hmin being a minimum height required for liquid in said first and said second longitudinal ducts while they are in communication with each other via said valve in order to obtain uniform distribution of liquid among various orifices of said first and said second series of manifolds.

4. The double liquid distribution device according to claim 3, further comprising first and second distributors configured in such a manner that a) $Q_2min$ is less than or equal to $Q_1max-Q_1min$;

the first and second distributors being defined as consisting of:
the first longitudinal duct and the orifices of the first series of manifolds, for the first distributor; and
the second longitudinal duct and the orifices of the second series of manifolds, for the second distributor; and
$Q_1$ min and $Q_2$min being defined respectively as combined minimum flow rates through the orifices of the first and the second series of manifolds respectively, that enable liquid to be distributed uniformly by said first and second series of manifolds; and
$Q_1$max being defined as the maximum flow rate of the first distributor when the liquid height in the first longitudinal duct is of maximum value Hmax; and
- b) when said valve is opened and the at least two longitudinal liquid downflow ducts are put into communication with each other, the level of the liquid in the first longitudinal duct that was at a value Hmax moves down to a liquid level $H_0$ in the second longitudinal duct that is identical to the level of the first longitudinal duct, $H_0$ being greater than or equal to Hmin, Hmin being a common minimum height required for liquid in said first and said second longitudinal ducts in communication via said valve for obtaining uniform distribution of liquid among the various orifices of said first and said second series of manifolds.

5. The double liquid distribution device according to claim 1, further comprising first and second distributors configured in such a manner that a flow rate corresponding to a threshold for triggering opening of said valve while flow rate is increasing in order to pass from a mode of operation with only the first distributor in action to a double distribution mode of operation with both the first and the second distributors in action is greater than the flow rate corresponding to the threshold for triggering closing of the valve while flow rate is decreasing in order to pass from the double distribution mode of operation with both the first and second distributors in action to the mode of operation with only the first distributor in action.

6. The double liquid distribution device according to claim 4, wherein the first and second distributors are configured in such a manner that:
- a) $Q_2min$ is less than $Q_1max-Q_1min$; and
- b) $H_0$ is greater than Hmin but less than Hmax.

7. The double liquid distribution device according to claim 1, wherein the transverse tubular manifolds extend in parallel in a transverse direction perpendicular to an axial longitudinal direction of the double liquid distribution device, and both series of manifolds are arranged at a same level in the axial longitudinal direction of the double distribution device, the manifolds of the first series being interleaved in parallel between the manifolds of the second series.

8. A vessel or floating support including a vertical apparatus that is the seat of a gravity flow of a liquid phase and including at least one double liquid distribution device according to claim 1 arranged coaxially inside a cylindrical wall of said vertical apparatus above a zone needing to be sprayed in uniform manner with the liquid,
said zone extending over a cross section of said vertical apparatus perpendicularly relative to an axial longitudinal direction of said cylindrical wall,
said high collector tray being arranged transversely and coaxially relative to said cylindrical wall and adjacent to said cylindrical wall.

9. The vessel or floating support according to claim 8, wherein said vertical apparatus has a plurality of zones extending over the cross section of said vertical apparatus and spaced apart from one another in the axial longitudinal direction of said cylindrical wall, with a plurality of said double liquid distribution devices, each interposed between two packing beds.

10. The vessel or floating support according to claim 8, wherein said vertical apparatus is a fractionating or wash column containing at least one packing bed extending in a zone over a cross section of said column perpendicularly to an axial longitudinal direction of said column.

11. A method of distributing liquid by using a double liquid distribution device according to claim 1, receiving a liquid on said high collector tray, the method being wherein the following steps are performed:
- e.1) filling the first longitudinal duct with liquid; and
- e.2) when the liquid level in the first longitudinal duct reaches a maximum threshold value, opening said valve and putting the at least two longitudinal liquid downflow ducts into communication with each other, thereby filling the second longitudinal duct to an identical liquid level as the first longitudinal duct; and
- e.3) re-closing said valve if said identical liquid level of said first and said second longitudinal ducts decreases below a minimum threshold value.

12. The method according to claim 11, wherein the opening or the closing of the valve is triggered automatically as a function of measuring the liquid level in said first and the second longitudinal ducts, in such a manner that:
- a) in step e.2), with flow rate increasing in said first longitudinal duct only, said valve opens automatically when the liquid level in the first longitudinal duct reaches a maximum threshold value Hmax; and
- b) in step e.3), with flow rate decreasing in both of said first and said second longitudinal ducts, the valve closes automatically when the identical liquid level in the first and second longitudinal ducts that are in communication via the open valve drops down to a minimum threshold value greater than or equal to Hmin, Hmin being a minimum common height required for liquid in said first and said second longitudinal ducts while they are in communication with each other via said valve in order to obtain uniform distribution of liquid among various orifices of said first and second series of manifolds.

13. The method according to claim 12, wherein the double liquid distribution device comprises first and second distributors and, wherein in step e.2), said valve is opened and the at least two longitudinal liquid downflow ducts are put into communication with each other such that the level of the liquid in the first longitudinal duct, which was of maximum value Hmax, drops down to a liquid level $H_0$ in the second longitudinal duct that is identical to the level of the first longitudinal duct, $H_0$ being greater than or equal to Hmin and corresponding to a flow rate of the second distributor that is greater than or equal to $Q_2$min; the first and second distributors being configured in such a manner that:
   a) $Q_2$min is less than or equal to $Q_1$max-$Q_1$min;
   the first and second distributors being defined as consisting of:
   the first longitudinal duct and the orifices of the first series of manifolds, for the first distributor; and
   the second longitudinal duct and the orifices of the second series of manifolds, for the second distributor; and
   $Q_1$min and $Q_2$min being defined respectively as combined minimum flow rates through the orifices of the first and the second series of manifolds respectively, that enable liquid to be distributed uniformly by said first and said second series of manifolds; and
   $Q_1$max being defined as the maximum flow rate of the first distributor when the liquid height in the first longitudinal duct is of maximum value Hmax; and
   b) on opening said valve and putting the at least two longitudinal liquid downflow ducts into communication with each other, the level of the liquid in the first longitudinal duct, which is of maximum value Hmax, drops down to a liquid level $H_0$ in the second longitudinal duct that is identical to the level of the first longitudinal duct, $H_0$ being greater than or equal to Hmin.

14. The method according to claim 13, wherein in step e.2), said valve is opened and the at least two longitudinal liquid downflow ducts are put into communication with each other such that the level of the liquid in the first longitudinal duct, which was of maximum value Hmax, drops down to a liquid level $H_0$ in the second longitudinal duct that is identical to the level of the first longitudinal duct, $H_0$ being greater than Hmin and corresponding to a flow rate of the second distributor that is greater than $Q_2$min; $Q_2$min being greater than $Q_1$max-$Q_1$min, the first and second distributors being configured in such a manner that:
   a) $Q_2$min is less than $Q_1$max-$Q_1$min; and
   b) on opening said valve and putting the at least two longitudinal liquid downflow ducts into communication with each other, the level of the liquid in the first longitudinal duct, which is of maximum value $H_1$max, drops down to a liquid level $H_0$ in the second longitudinal duct that is identical to the level of the first longitudinal duct, $H_0$ being greater than or equal to Hmin.

15. The method according to claim 11, wherein a flow rate corresponding to the threshold for triggering opening of said valve, while flow rate is increasing, in order to pass from a mode of operation with only the first distributor in action to a double distribution mode of operation with both the first and the second distributors in action is greater than the flow rate corresponding to the threshold for triggering closing of the valve, while flow rate is decreasing, in order to pass from the double distribution mode of operation with both the first and second distributors in action to the mode of operation with only the first distributor in action.

16. The method according to claim 14, wherein it comprises the following steps:
   1) increasing the liquid level in the first longitudinal duct only; and
   2) opening said valve when the liquid level reaches the maximum height threshold Hmax in the first longitudinal duct corresponding to a maximum uniform flow rate $Q_1$max of the first distributor and putting the at least two longitudinal liquid downflow ducts into communication so that the level of the liquid in the first longitudinal duct, which was of maximum value Hmax, drops down to a liquid level $H_0$ in the second longitudinal duct that is identical to the level of the first longitudinal duct, $H_0$ being greater than said value Hmin; and
   3) the liquid level increases from $H_0$ in both the first and the second longitudinal ducts, the device now being in a double distribution mode of operation with both the first and second distributors in action, the combined flow rate of both distributors increasing from $Q_1$max to $Q_1$max+$Q_2$max, $Q_2$max being defined as the maximum flow rate of the second distributor when the identical liquid height in the first and second longitudinal ducts is at a maximum Hmax; and
   4) when the device is in the double distribution mode of operation with both the first and second distributors in action, the flow rate lying in a range Qimax to $Q_1$max+$Q_2$max, if the flow rate decreases, said valve is closed only when the flow rate reaches a minimum threshold value $Q_0$ in a range $Q_1$min to $Q_1$max with a level Hmin of the liquid in both the first and the second longitudinal ducts, $Q_0$ being greater than or equal to $Q_1$min+$Q_2$; and
   5) after closing said valve, the liquid level in the first longitudinal duct rises to a value $H_1$ greater than Hmin but less than Hmax with a flow rate in the range $Q_1$min and $Q_1$max, the device remains in a single distribution mode of operation with only the first distributor in action so long as the liquid level does not exceed Hmax in the first longitudinal duct.

* * * * *